US011962099B2

(12) United States Patent
Huang et al.

(10) Patent No.: US 11,962,099 B2
(45) Date of Patent: Apr. 16, 2024

(54) ANTENNA STRUCTURE AND HIGH-FREQUENCY MULTI-BAND WIRELESS COMMUNICATION TERMINAL

(71) Applicant: VIVO MOBILE COMMUNICATION CO., LTD., Chang'an Dongguan (CN)

(72) Inventors: Huan-Chu Huang, Chang'an Dongguan (CN); Yijin Wang, Chang'an Dongguan (CN); Xianjing Jian, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 390 days.

(21) Appl. No.: 17/357,197

(22) Filed: Jun. 24, 2021

(65) Prior Publication Data

US 2021/0320408 A1 Oct. 14, 2021

Related U.S. Application Data

(63) Continuation of application No. PCT/CN2019/126194, filed on Dec. 18, 2019.

(30) Foreign Application Priority Data

Dec. 28, 2018 (CN) ........................ 201811629736.X

(51) Int. Cl.
*H01Q 5/10* (2015.01)
*H01Q 1/24* (2006.01)
(Continued)

(52) U.S. Cl.
CPC ............... *H01Q 5/10* (2015.01); *H01Q 1/243* (2013.01); *H01Q 5/307* (2015.01); *H01Q 23/00* (2013.01)

(58) Field of Classification Search
CPC ........ H01Q 1/243; H01Q 1/2283; H01Q 1/44; H01Q 1/523; H01Q 5/10; H01Q 5/307;
(Continued)

(56) References Cited

U.S. PATENT DOCUMENTS

2009/0058731 A1 3/2009 Geary et al.
2015/0116169 A1 4/2015 Ying
(Continued)

FOREIGN PATENT DOCUMENTS

CN 101378148 A 3/2009
CN 107742781 A 2/2018
(Continued)

OTHER PUBLICATIONS

Extended European Search Report related to Application No. 19905339.8 reported on Jan. 24, 2022.
(Continued)

*Primary Examiner* — Hoang V Nguyen
(74) *Attorney, Agent, or Firm* — von Briesen & Roper, s.c.

(57) ABSTRACT

An antenna structure and a high-frequency multi-band wireless communication terminal are provided. The antenna structure includes: a metal plate, on which a first accommodation groove is provided; an antenna unit, including a radiating patch and a first coupling piece; and a radio frequency module, where the radio frequency module is disposed on a first side of the metal plate, and the radio frequency module is electrically connected to the radiating patch; where at least one of the radiating patch and the first coupling piece is disposed inside the first accommodation groove, the radiating patch is insulated from the metal plate, the first coupling piece is insulated from the metal plate, the radiating patch and the first coupling piece are disposed opposite to each other, the radiating patch is insulated from
(Continued)

the first coupling piece, the first coupling piece is located between the radiating patch and the radio frequency module.

20 Claims, 10 Drawing Sheets

(51) Int. Cl.
*H01Q 5/307* (2015.01)
*H01Q 23/00* (2006.01)

(58) Field of Classification Search
CPC ........ H01Q 5/378; H01Q 5/28; H01Q 9/0414; H01Q 21/08; H01Q 23/00
See application file for complete search history.

(56) References Cited

U.S. PATENT DOCUMENTS

| | | | |
|---|---|---|---|
| 2016/0351996 A1 | 12/2016 | Ou | |
| 2017/0353338 A1* | 12/2017 | Amadjikpe | H01Q 21/065 |
| 2018/0219281 A1 | 8/2018 | Sudo et al. | |
| 2020/0161766 A1 | 5/2020 | Liu et al. | |
| 2021/0218155 A1 | 7/2021 | Huang et al. | |

FOREIGN PATENT DOCUMENTS

| | | | |
|---|---|---|---|
| CN | 108417995 | A | 8/2018 |
| CN | 108987943 | A | 12/2018 |
| CN | 109066055 | A | 12/2018 |
| CN | 109728405 | A | 5/2019 |
| CN | 109748447 | A | 5/2019 |
| EP | 1777554 | A2 | 4/2007 |
| JP | 2015111747 | A | 6/2015 |
| JP | 2018125704 | A | 8/2018 |
| KR | 20180011775 | A | 2/2018 |
| WO | 2018210054 | A1 | 11/2018 |

OTHER PUBLICATIONS

International Search Report and Written Opinion related to PCT/CN2019/126194 reported on Mar. 27, 2020.
First Chinese Office Action related to Application No. 201811629736.X reported on Jan. 2, 2020.
Huang et al.; "Novel Integrated Design of Dual-Band Dual-Polarization mm-Wave Antennas in Non-mm-Wave Antennas (AiA) for a 5G Phone with a Metal Frame"; vivo Mobile Communication Co., Ltd No. 255, BBK Rd., Wusha, Chang'an Township, Dongguan City, Guangdong Provice, China 523860, pp. 125-128.
First Korean Office Action related to Application No. 10-2021-7022955; reported on Dec. 7, 2022.
Japanese Notice of Reasons for Refusal for related Application No. 2021-538023; reported on Jul. 21, 2022.
Indian Examination Report for related Application No. 202127032627; reported on Aug. 1, 2022.

* cited by examiner

ANTENNA STRUCTURE AND HIGH-FREQUENCY MULTI-BAND WIRELESS COMMUNICATION TERMINAL

CROSS-REFERENCE OF RELATED APPLICATION

This application is a continuation application of PCT Application No. PCT/CN2019/126194 filed on Dec. 18, 2019, which claims priority to Chinese Patent Application No. 201811629736.X, filed on Dec. 28, 2018 in china, disclosures of which are incorporated herein by reference in their entireties.

TECHNICAL FIELD

The present disclosure relates to the field of communications technologies, and in particular, to an antenna structure and a high-frequency multi-band wireless communication terminal.

BACKGROUND

As the $5^{th}$ generation mobile networks (5G) era comes and develops, and wireless communication requires faster and faster data transmission rates, the millimeter wave technology and applications will play a key role. Therefore, millimeter-wave antennas and design are gradually introduced on mobile terminals, such as mobile phones, tablets, and even notebook computers. Therefore, design and performance of millimeter-wave antennas have become a hot topic for related antenna engineers and electromagnetic researchers.

In related technologies, a mainstream millimeter-wave antenna solution is often in the form of an independent antenna in package (AiP), which is discretely disposed relative to an existing antenna such as a cellular (cellular) antenna and a non-cellular antenna, and therefore squeezes available space of the existing antenna, resulting in performance degradation of the antenna, increase in the overall system size, and decrease in the overall competitiveness of the product.

SUMMARY

The embodiments of the present disclosure provide an antenna structure and a high-frequency multi-band wireless communication terminal.

According to a first aspect, an embodiment of the present disclosure provides an antenna structure, including:

a metal plate, where the metal plate is provided with a first accommodation groove;

an antenna unit, where the antenna unit includes a radiating patch and a first coupling piece; and a radio frequency module, where the radio frequency module is disposed on a first side of the metal plate, and the radio frequency module is electrically connected to the radiating patch;

where at least one of the radiating patch and the first coupling piece is disposed inside the first accommodation groove, the radiating patch is insulated from the metal plate, the first coupling piece is insulated from the metal plate, the radiating patch and the first coupling piece are disposed opposite to each other, the radiating patch is insulated from the first coupling piece, the first coupling piece is located between the radiating patch and the radio frequency module, the radiating patch is configured to generate resonance in a first preset band, and the first coupling piece is configured to generate resonance in a second preset band.

According to a second aspect, the embodiments of the present disclosure provide a high-frequency multi-band wireless communication terminal, including the foregoing antenna structure.

DETAILED DESCRIPTION OF EMBODIMENTS

Figure 1:
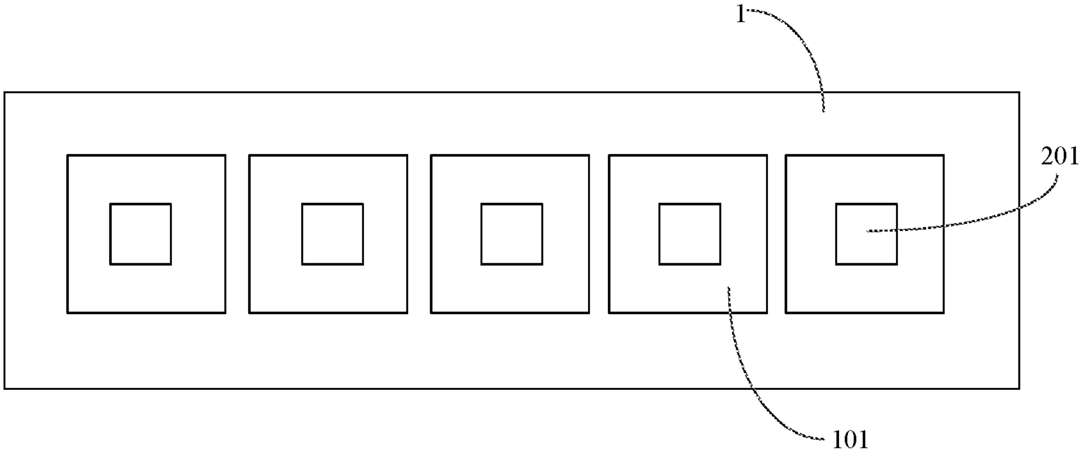
FIG. 1 is a first schematic diagram in which a radiating patch is disposed in a first accommodation groove according to an embodiment of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

An embodiment of the present disclosure provides an antenna structure, including:

a metal plate 1, where the metal plate 1 is provided with a first accommodation groove 101; optionally, a depth of the first accommodation groove 101 is equal to a thickness of the metal plate 1, that is, the first accommodation groove 101 is a groove passing through the metal plate 1;

an antenna unit, where the antenna unit includes a radiating patch 201 and a first coupling piece 202; and a radio frequency module, where the radio frequency module is located on a first side of the metal plate 1, and the radio frequency module is electrically connected to the radiating patch 201, where the first side is an opening side of the accommodation groove, and when the first side of the metal plate 1 faces the inside of the terminal, the radio frequency module is disposed inside the terminal;

where at least one of the radiating patch 201 and the first coupling piece 202 is disposed inside the first accommodation groove 101, the radiating patch 201 is insulated from the metal plate 1, the first coupling piece 202 is insulated from the metal plate 1, the radiating patch 201 and the first coupling piece 202 are disposed opposite to each other, the radiating patch 201 is insulated from the first coupling piece 202, the first coupling piece 202 is located between the radiating patch 201 and the radio frequency module, the radiating patch 201 is configured to generate resonance in a first preset band, the first coupling piece 202 is configured to generate resonance in a second preset band, the first coupling piece is configured to generate a working band different from that of the radiating patch.

According to the antenna structure of the embodiments of the present disclosure, an accommodation groove is opened on the metal plate 1, at least one of the radiating patch 201 and the coupling piece of the antenna unit is disposed in the accommodation groove, and the radio frequency module electrically connected to the radiating patch 201 is located on one side of the metal plate 1, so that the antenna structure is integrated on the metal plate 1, thereby reducing space occupied by the antenna on the terminal.

Optionally, an area of the radiating patch 201 is less than or equal to an area of the first coupling piece 202. In this case, the first coupling piece 202 is configured to generate a low-frequency resonance signal, and the radiating patch 201 is configured to generate a high-frequency resonance signal, so that the antenna unit can work in multiple bands.

Optionally, there are multiple first accommodation grooves 101, the multiple first accommodation grooves 101 are disposed at intervals, there are multiple antenna units corresponding to the multiple first accommodation grooves 101, and at least one of the radiating patch 201 and the first coupling piece 202 of each antenna unit is disposed inside an accommodation groove corresponding to the antenna unit.

Multiple antenna units form an array antenna, so that the antenna structure of the embodiments of the present disclosure can work in multiple bands, thereby having better global roaming capabilities.

In addition, details of a manner of integrating the radiating patches 201 and the first coupling pieces 202 of the multiple antenna units on the metal plate 1 are as follows:

Manner 1

Optionally, the first accommodation groove 101 is provided with a first insulating dielectric layer, and the radiating patch 201 is disposed inside the first insulating dielectric layer. That is, as shown in FIG. 1, the metal plate 1 is provided with multiple first accommodation grooves 101, a radiating patch 201 is disposed inside each groove, and a part of the metal plate 1 between the grooves forms a metal spacer structure. Therefore, there is a certain interval between the grooves. In addition, the radiating patch 201 is disposed inside the first accommodation groove 101, so that the area of the radiating patch 201 is smaller than the area of the groove. Therefore, the radiating patch 201 is insulated from the metal plate 1.

Figure 2:
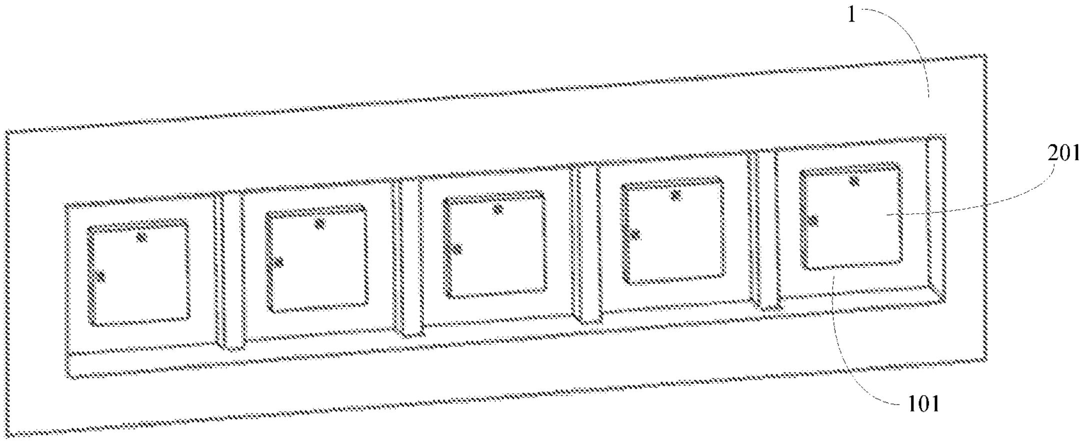
FIG. 2 is a second schematic diagram in which a radiating patch is disposed in a first accommodation groove according to an embodiment of the present disclosure.
Figure 3:
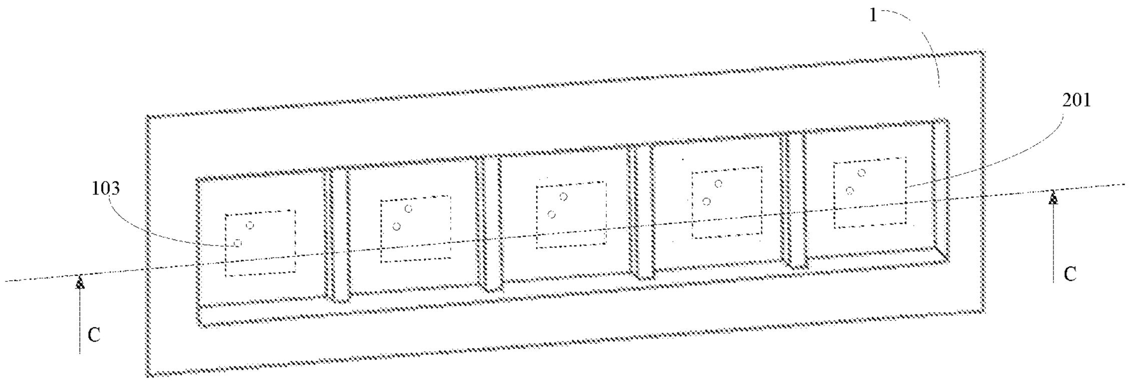
FIG. 3 is a third schematic diagram in which a radiating patch is disposed in a first accommodation groove according to an embodiment of the present disclosure.

When the radiating patch 201 is disposed inside the first insulating dielectric layer in the first accommodation groove 101, an insulating medium with a first preset height (less than a depth of the first accommodation groove 101) may be first filled in the first accommodation groove 101, and then the radiating patch 201 is placed on a surface of the filled insulating medium, as shown in FIG. 2. Then, an insulating medium is filled again on the basis of FIG. 2, so that the insulating medium covers the radiating patch 201, as shown in FIG. 3. The first insulating dielectric layer filled in the first accommodation groove 101 may be flush with an outer surface (that is, a surface on which the radio frequency module is not placed) of the metal plate 1.

Optionally, the radio frequency module has a first ground layer 304, a second insulating dielectric layer 308 covers a surface of the first ground layer 304, the first coupling piece 202 is disposed on the second insulating dielectric layer 308, and the first coupling piece 202 is disposed at intervals. That is, as shown in FIG. 5 and FIG. 6, the first coupling piece 202 is distributed on the second insulating medium at intervals.

Figure 5:
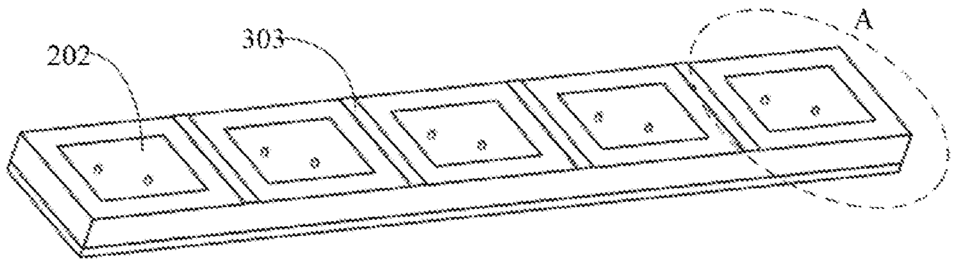
FIG. 5 is a first schematic diagram in which a first coupling piece is disposed on a radio frequency module according to an embodiment of the present disclosure.
Figure 6:
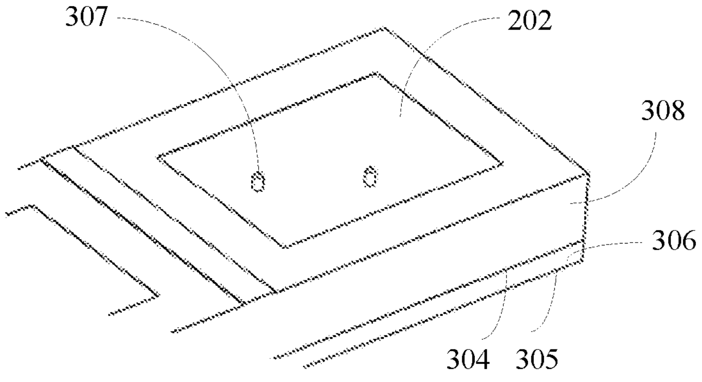
FIG. 6 is a partial enlarged view of a location circled by a dashed frame A in FIG. 5.
Figure 14:
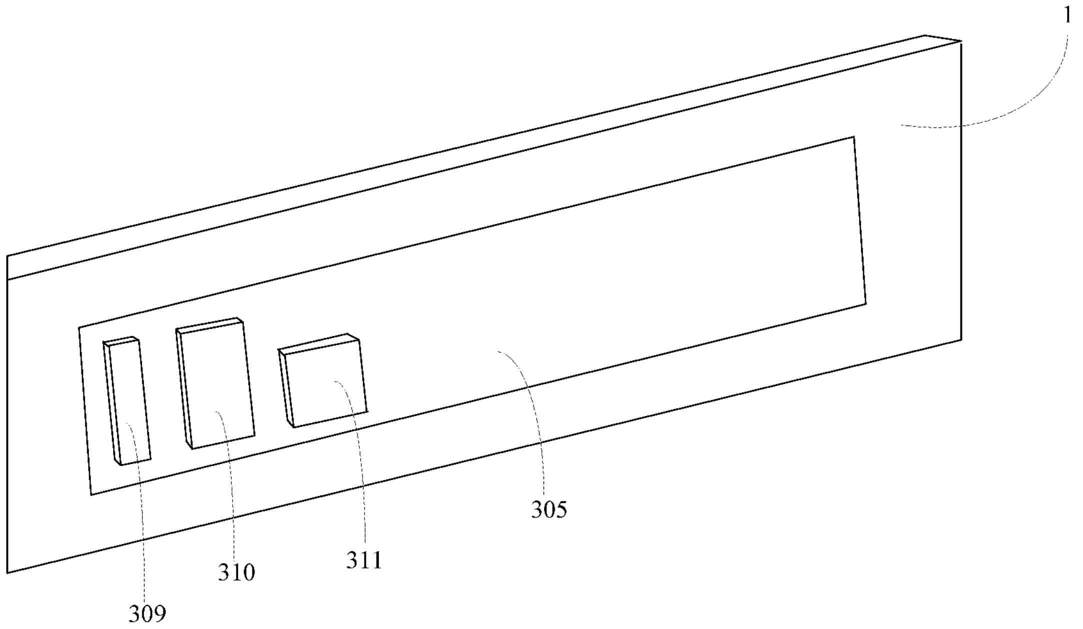
FIG. 14 is a schematic diagram of an effect of mounting a radio frequency module on a surface of a metal plate according to an embodiment of the present disclosure.

It can be seen from the above that the radio frequency module shown in FIG. 5 is disposed on one side of the metal plate 1 shown in FIG. 3 (a specific mounting effect is shown in FIG. 14), so that the first coupling piece 202 and the radiating patch 201 are disposed opposite to each other and are insulated. At this time, the first coupling piece 202 is located between the radiating patch 201 and the first ground layer 304 of the radio frequency module, and the area of the first coupling piece 202 is greater than or equal to the area of the radiating patch 201. The first coupling piece 202 is configured to generate a low-frequency resonance signal, and the radiating patch 201 is configured to generate a high-frequency resonance signal, so that the antenna unit can work in multiple bands.

Optionally, the antenna structure of the embodiments of the present disclosure further includes: a metal piece 303, where the metal piece 303 is disposed on the second insulating dielectric layer 308, the metal piece 303 is located between two adjacent first coupling pieces 202, the metal piece 303 is grounded, and the metal piece 303 and the metal plate 1 are connected to the ground. The metal piece 303 may be electrically connected to the first ground layer 304 through a via to achieve grounding of the metal piece 303.

The metal piece 303 separates the multiple first coupling pieces 202 from each other, and the metal piece 303 disposed on the second insulating dielectric layer 308 at intervals and the metal plate 1 are connected to the ground, so that the metal plate 1 between adjacent first accommodation grooves 101 may form a spaced ground, thereby reducing coupling between adjacent antenna units and improving isolation between antenna units.

Optionally, the second insulating dielectric layer 308 is provided with a third accommodation groove 302, the third accommodation groove 302 is located between two adjacent first coupling pieces 202, the third accommodation groove 302 has a depth equal to a thickness of the second insulating dielectric layer 308, the metal plate 1 between the first accommodation grooves 101 extends into the third accommodation groove 302, and the metal plate 1 between the first accommodation grooves 101 and the first ground layer 304 are connected to the ground.

The second accommodation groove 301 is configured to accommodate the metal plate 1 between the first accommodation grooves 101, so that the radio frequency module can be more precisely embedded in the metal plate 1. In addition, after the metal plate 1 between the first accommodation grooves 101 extends into the third accommodation groove 302, the metal plate 1 and the first ground layer 304 of the radio frequency module are connected to the ground, so that the metal plate 1 between the adjacent first accommodation grooves 101 can form a spaced ground, thereby reducing coupling between adjacent antenna units and improving isolation between antenna units.

Manner 2

Optionally, the first accommodation groove 101 is provided with a first insulating dielectric layer, the radiating patch 201 is provided on the first insulating dielectric layer, and the radiating patch 201 extends by a first preset height from a surface of the first insulating dielectric layer. In this case, an effect of fixing the radiating patch 201 in the first accommodation groove 101 is shown in FIG. 2. The first insulating dielectric layer filled in the first accommodation groove 101 can be flush with the outer surface (that is, a surface on which the radio frequency module is not placed) of the metal plate 1. The radio frequency module has the first ground layer 304, the second insulating dielectric layer 308 covers the surface of the first ground layer 304, multiple second accommodation grooves 301 corresponding to the multiple antenna units are disposed on the second insulating dielectric layer 308 at intervals, and each first coupling piece 202 is placed in a corresponding second accommodation groove 301. A difference between a depth of the second accommodation groove 301 and a thickness of the first coupling piece 202 is greater than or equal to the first preset height. The radiating patch 201 is located in the second accommodation groove 301.

Figure 7:
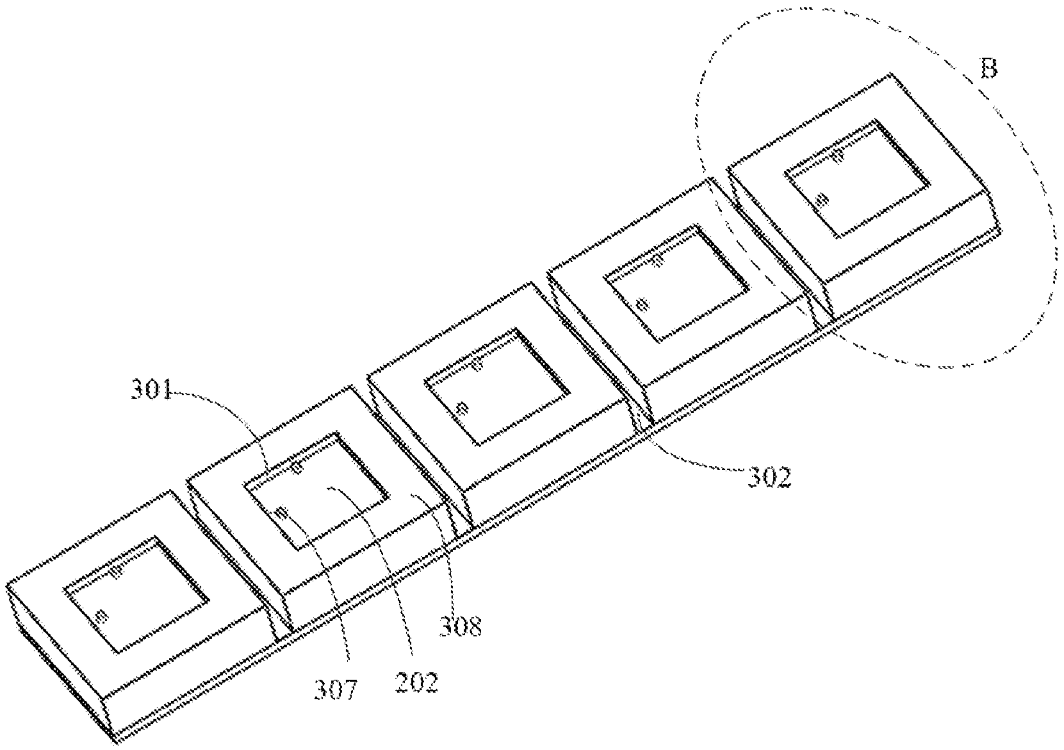
FIG. 7 is a second schematic diagram in which a first coupling piece is disposed on a radio frequency module according to an embodiment of the present disclosure.
Figure 8:
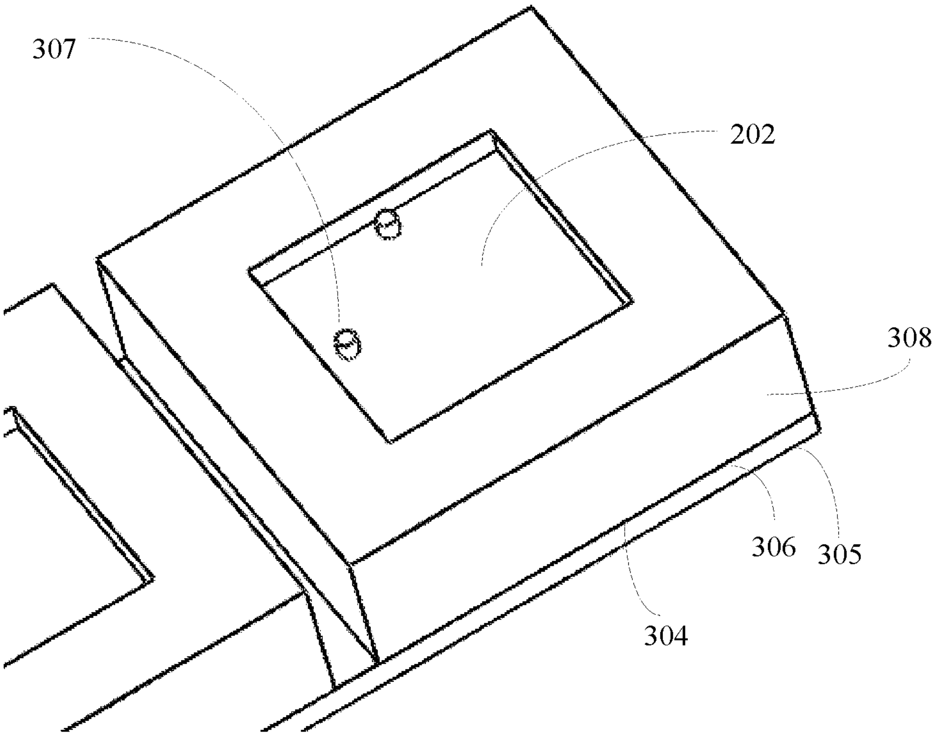
FIG. 8 is a partial enlarged view of a location circled by a dashed frame B in FIG. 7.

That is, as shown in FIG. 7 and FIG. 8, the first coupling piece 202 is located in the insulating groove (that is, the second accommodation groove 301). The difference between the depth of the second accommodation groove 301 and the thickness of the first coupling piece 202 is greater than or equal to the first preset height, that is, the difference between the depth of the second accommodation groove 301 and the thickness of the first coupling piece 202 can be greater than or equal to the height by which the radiating patch 201 extends from the first insulating dielectric layer. Therefore, when the radio frequency module shown in FIG. 7 is placed on one side of the metal plate 1 shown in FIG. 2 (the specific mounting effect is shown in FIG. 14), the sidewall of the second accommodation groove 301 abuts on the surface of the first insulating dielectric layer of the first accommodation groove 101, and the radiating patch 201 can be spaced from the first coupling piece 202 by a certain distance, and is not electrically connected to the first coupling piece 202. At this time, the first coupling piece 202 is located between the radiating patch 201 and the first ground layer 304 of the radio frequency module, and the area of the first coupling piece 202 is greater than or equal to the area of the radiating patch 201. The first coupling piece 202 is configured to generate a low-frequency resonance signal, and the radiating patch 201 is configured to generate a high-frequency resonance signal, so that the antenna unit can work in multiple bands.

Optionally, the antenna structure of the embodiments of the present disclosure further includes: a metal piece 303, where the metal piece 303 is disposed on the second insulating dielectric layer 308, the metal piece 303 is located between two adjacent first coupling pieces 202, the metal piece 303 is grounded, and the metal piece 303 and the metal plate 1 are in contact with each other.

The metal piece 303 separates the multiple first coupling pieces 202 from each other, and the metal piece 303 disposed on the second insulating dielectric layer 308 at intervals are in contact with the metal plate 1, so that the metal piece 303 is electrically connected to the metal plate 1, and when the metal piece 303 is grounded, the metal plate 1 is also grounded. Therefore, the metal plate 1 between adjacent first accommodation grooves 101 may form a spaced ground, thereby reducing coupling between adjacent antenna units and improving isolation between antenna units.

Optionally, the second insulating dielectric layer 308 is provided with a third accommodation groove 302, the third accommodation groove 302 is located between two adjacent first coupling pieces 202, the third accommodation groove 302 has a depth equal to a thickness of the second insulating dielectric layer 308, the metal plate 1 between the first accommodation grooves 101 extends into the third accommodation groove 302, and the metal plate 1 between the first accommodation grooves 101 and the first ground layer 304 are connected to the ground.

The second accommodation groove 301 is configured to accommodate the metal plate 1 between the first accommodation grooves 101, so that the radio frequency module can be more precisely embedded in the metal plate 1. In addition, after the metal plate 1 between the first accommodation grooves 101 extends into the third accommodation groove 302, the metal plate 1 and the first ground layer 304 of the radio frequency module are connected to the ground, so that the metal plate 1 between the adjacent first accommodation grooves 101 can form a spaced ground, thereby reducing coupling between adjacent antenna units and improving isolation between antenna units.

Manner 3

Optionally, the first accommodation groove 101 is provided with a first insulating dielectric layer, and the radiating patch 201 is disposed inside the first insulating dielectric layer. The first insulating dielectric layer filled in the first accommodation groove 101 may be flush with an outer surface (that is, a surface on which the radio frequency module is not placed) of the metal plate 1.

Optionally, a first coupling piece 202 is disposed in the first insulating medium layer in the first accommodation groove 101, and the first coupling piece 202 and the radiating patch 201 that belong to the same antenna unit are located in the same first accommodation groove 101.

Figure 10:
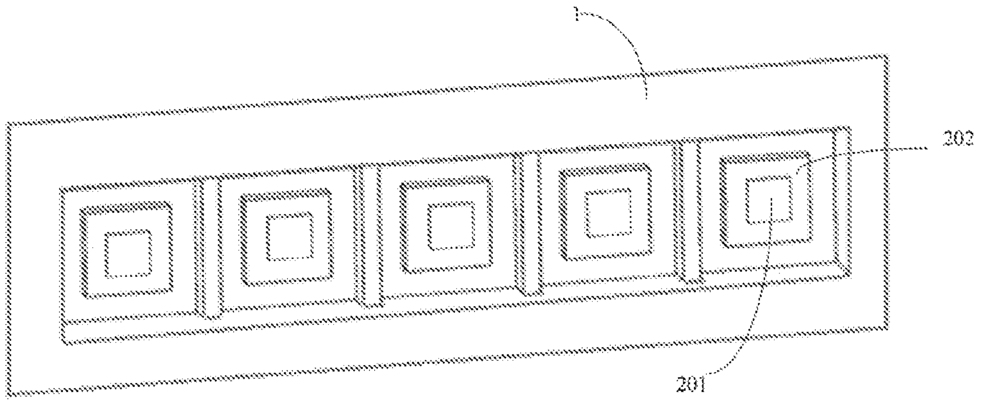
FIG. 10 is a schematic diagram in which a radiating patch and a first coupling piece are both disposed in a first accommodation groove according to an embodiment of the present disclosure.

That is, as shown in FIG. 10, the radiating patch 201 and the first coupling piece 202 that belong to the same antenna unit are disposed in the first insulating dielectric layer in the first accommodation groove 101. It should be noted that, to clearly indicate that both the first coupling piece 202 and the radiating patch 201 are fixed in the first accommodation groove 101, the medium that insulates the first coupling piece 202 and the radiating patch 201 is not shown in FIG. 10.

Optionally, the radio frequency module has a first ground layer 304, a second insulating dielectric layer 308 covers a surface of the first ground layer 304, the second insulating dielectric layer 308 is provided with a third accommodation groove 302, the third accommodation groove 302 has a depth equal to a thickness of the second insulating dielectric layer 308, the metal plate 1 between the first accommodation grooves 101 extends into the third accommodation groove 302, and the metal plate 1 between the first accommodation grooves 101 and the first ground layer 304 are connected to the ground.

The second accommodation groove 301 is configured to accommodate the metal plate 1 between the first accommodation grooves 101, so that the radio frequency module can be more precisely embedded in the metal plate 1. In addition, after the metal plate 1 between the first accommodation grooves 101 extends into the third accommodation groove 302, the metal plate 1 and the first ground layer 304 of the radio frequency module are connected to the ground, so that the metal plate 1 between the adjacent first accommodation grooves 101 can form a spaced ground, thereby reducing coupling between adjacent antenna units and improving isolation between antenna units.

In addition, when the radiating patch 201 and the first coupling piece 202 are integrated on the metal plate 1 in this way, the radiating patch 201 and the first coupling piece 202 can be disposed as a part of the metal plate 1, that is, are designed in a certain area of the metal plate 1 through overlay design, so that the metal plate 1 in this area can form multiple antenna units. Therefore, the part of the metal plate 1 is used as the radiating patch 201 of the antenna, thereby increasing the bandwidth of the antenna to cover multiple bands. The metal plate 1 can be a part of the metal shell of the terminal, so that disposing of the antenna unit does not affect the metal texture of the terminal.

Manner 4

Optionally, there are multiple antenna units, the second insulating dielectric layer 308 is disposed on the radio frequency module, the first coupling piece 202 is disposed in the second insulating dielectric layer 308, the first coupling piece 202 is disposed at intervals, the radiating patch 201 is disposed in the second insulating dielectric layer 308 and the radiating patch 201 is disposed at intervals, and the radio frequency module is mounted in the first accommodation groove.

That is, the radiating patch 201 and the first coupling piece 202 are both disposed on the radio frequency module.

Optionally, the antenna structure of the embodiments of the present disclosure further includes: a metal piece 303, where the metal piece 303 is disposed on the second insulating dielectric layer 308, the metal piece 303 is located between two adjacent first coupling pieces 202, the metal piece 303 is grounded, and the metal piece 303 and the metal plate 1 are in contact with each other.

The metal piece 303 separates the multiple first coupling pieces 202 from each other, and the metal piece 303 disposed on the second insulating dielectric layer 308 at intervals are in contact with the metal plate 1, so that the metal piece 303 is electrically connected to the metal plate 1, and when the metal piece 303 is grounded, the metal plate 1 is also grounded. Therefore, the metal plate 1 between adjacent first accommodation grooves 101 may form a spaced ground, thereby reducing coupling between adjacent antenna units and improving isolation between antenna units.

Optionally, the radio frequency module has a first ground layer 304, the second insulating dielectric layer 308 covers the first ground layer 304, the second insulating dielectric layer 308 is provided with a third accommodation groove 302, the third accommodation groove 302 is located between two adjacent first coupling pieces 202, the third accommodation groove 302 has a depth equal to a thickness of the second insulating dielectric layer 308, the metal plate 1 between the first accommodation grooves 101 extends into the third accommodation groove 302, and the metal plate 1 between the first accommodation grooves 101 is electrically connected to the first ground layer 304.

The second accommodation groove 301 is configured to accommodate the metal plate 1 between the first accommodation grooves 101, so that the radio frequency module can be more precisely embedded in the metal plate 1. In addition, after the metal plate 1 between the first accommodation grooves 101 extends into the third accommodation groove 302, the metal plate 1 and the first ground layer 304 of the radio frequency module are connected to the ground, so that the metal plate 1 between the adjacent first accommodation grooves 101 can form a spaced ground, thereby reducing coupling between adjacent antenna units and improving isolation between antenna units.

In addition, optionally, the surface of the metal piece 303 is provided with an ejector pin, and the ejector pin and the metal plate 1 are connected to the ground; or the surface of the metal plate 1 between the adjacent first accommodation grooves 101 is provided with a protrusion, and the protrusion and the metal piece 303 are connected to the ground, so that the metal piece 303 and the metal plate 1 can be better electrically connected to each other.

Optionally, the antenna unit further includes a second coupling piece 203, the second coupling piece 203 and the radiating patch 201 are disposed opposite to each other, the second coupling piece 203 is insulated from the radiating patch 201, the second coupling piece 203 is insulated from the metal plate 1, the radiating patch 201 is located between the second coupling piece 203 and the first coupling piece 202 (shown in FIG. 11), and the second coupling piece 203 is configured to increase the bandwidth of the first preset band, that is, the second coupling piece 203 is used to increase the working bandwidth of the radiating patch. Optionally, the area of the second coupling piece 203 is less than or equal to the area of the radiating patch 201.

Regardless of a manner of integrating the first coupling piece 202 and the radiating patch 201 into the metal plate 1, the second coupling piece 203 can be added, and the added second coupling piece 203 is disposed on a side of the radiating patch 201 away from the radio frequency module. Specifically, when the first coupling piece 202 and the radiating patch 201 are integrated on the metal plate 1 in manner 4, the added second coupling piece can be fixed in the first accommodation groove 101 on the metal plate 1.

Figure 4:
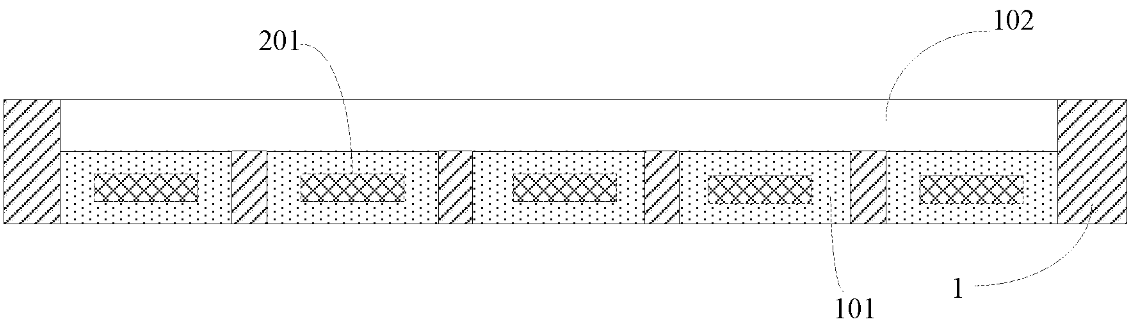
FIG. 4 is a schematic cross-sectional view along C-C in FIG. 3.

Optionally, as shown in FIG. 4, the metal plate 1 is provided with a positioning groove 102, multiple first accommodation grooves 101 are connected to the positioning groove 102, and the radio frequency module is mounted in the positioning groove 102, so that the radio frequency module can be more precisely mounted on the metal plate 1.

Figure 12:
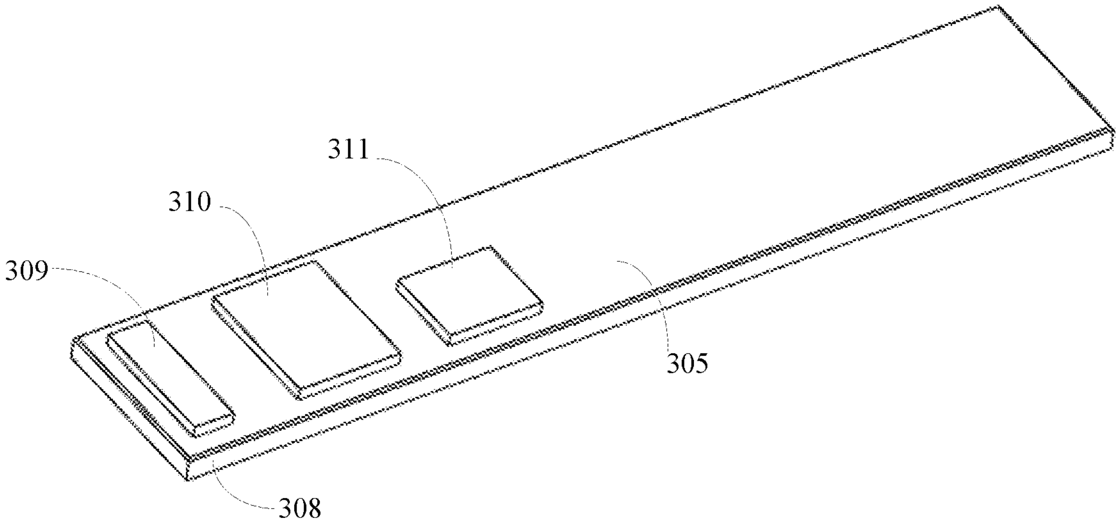
FIG. 12 is a schematic structural diagram of a radio frequency module according to an embodiment of the present disclosure.

Optionally, as shown in FIG. 12, the radio frequency module includes a radio frequency integrated circuit 310 and a power management integrated circuit 311, and the radio frequency integrated circuit 310 is electrically connected to the radiating patch 201 and the power management integrated circuit 311. The radio frequency module can also be provided with a BTB connector (Board-to-board Connectors, board-to-board connector) 309, which is configured to transfer an intermediate-frequency signal between the radio frequency module and a motherboard of the terminal. When the embodiments of the present disclosure include multiple antenna units, the radio frequency integrated circuit 310 is electrically connected to the radiating patch 201 of each antenna unit, so that a signal received by the radiating patch 201 finally converges in the radio frequency integrated circuit 310 through a transmission line connected to each radiating patch 201.

Further, as shown in FIG. 12, the radio frequency module also includes a first ground layer 304, a second ground layer 305, and a third insulating dielectric layer 306. The third insulating dielectric layer 306 is located between the first ground layer 304 and the second ground layer 305. The radio frequency integrated circuit 310 and the power management integrated circuit 311 are located on the second ground layer 305. The radio frequency integrated circuit 310 is electrically connected to the power management integrated circuit 311 through a first wire, and is electrically connected to the radiating patch 201 through a second wire, where the first wire and the second wire are located in the third insulating dielectric layer 306. The radio frequency integrated circuit 310 is placed on the ground layer of the radio frequency module to minimize loss of an antenna signal on the path. In addition, the first ground layer 304 and the second ground layer 305 may be electrically connected to each other through a via.

It should be noted that after the radio frequency module is disposed on one side of the metal plate 1, the first ground layer 304 of the radio frequency module is connected to an inner side of the metal plate 1 (a side on which the radio frequency module is placed), so that a reflector of the antenna unit can be formed to increase gains of the antenna unit, and the antenna unit can be less sensitive to a system environment behind the metal plate 1. Therefore, the terminal can integrate more devices to perform more functions, thereby enhancing competitiveness of products.

Optionally, the radio frequency module is provided with a feeding ejector pin 307, and the feeding ejector pin 307 and the radiating patch 201 are electrically connected to each other. It should be noted that the feeding ejector pin 307 and the metal plate 1 can be integrally designed, or the feeding ejector pin 307 and the radio frequency module can be integrally designed, or the feeding ejector pin 307 can be used as an independent discrete device for feeding a feed signal.

Figure 9:
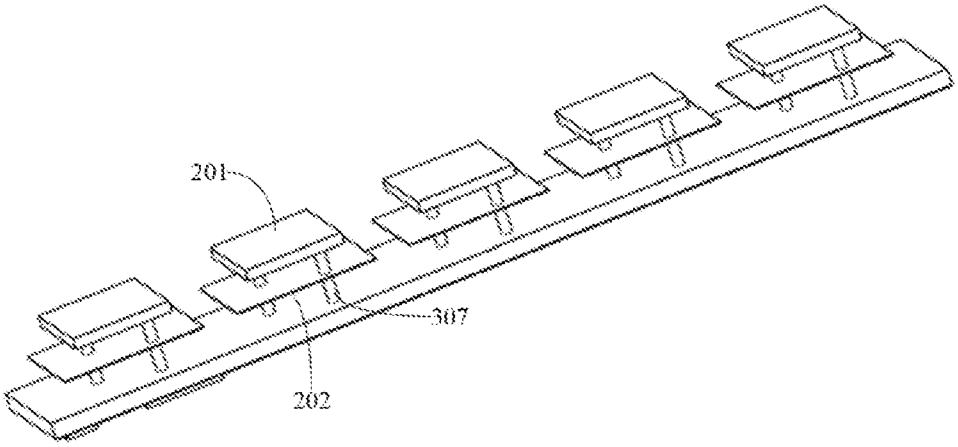
FIG. 9 is a first schematic diagram in which a feeding ejector pin is connected to a radiating patch according to an embodiment of the present disclosure.

Further, as shown in FIG. 9, the first coupling piece 202 is provided with a feeding hole, the feeding ejector pin 307 passes through the feeding hole and is electrically connected to the radiating patch 201, and a diameter of the feeding hole is larger than a diameter of the feeding ejector pin 307. That is, when the radiating patch 201 is located between the first coupling piece 202 and the radio frequency module, a feeding hole for the feeding ejector pin 307 to pass through needs to be opened in the first coupling piece 202. It should be noted that to illustrate the manner of connection between the feeding ejector pin 307 and the radiating patch 201 more clearly, the insulating dielectric layer used to fix the radiating patch 201 and the first coupling piece 202 is not shown in FIG. 9.

Specifically, when the radiating patch 201 and the first coupling piece 202 are integrated on the metal plate 1 in manner 2, a feeding hole further needs to be opened in the first coupling piece 202. In this way, the feeding ejector pin 307 can pass through the feeding hole and is electrically connected to the radiating patch 201. The diameter of the feeding hole is greater than the diameter of the feeding ejector pin 307.

Specifically, when the radiating patch 201 and the first coupling piece 202 are integrated on the metal plate 1 in manner 1 or 3, in addition to opening the feeding hole in the first coupling piece 202, it is also necessary to open a via 103 (as shown in FIG. 3) in the insulating medium between the first coupling piece 202 and the radiating patch 201, so that the feeding ejector pin 307 can pass through the feeding hole in the first coupling piece 202 and the via 103 in the insulating medium between the first coupling piece 202 and the radiating patch 201, and then is electrically connected to the radiating patch 201. The diameter of the feeding hole is greater than the diameter of the feeding ejector pin 307.

Figure 11:
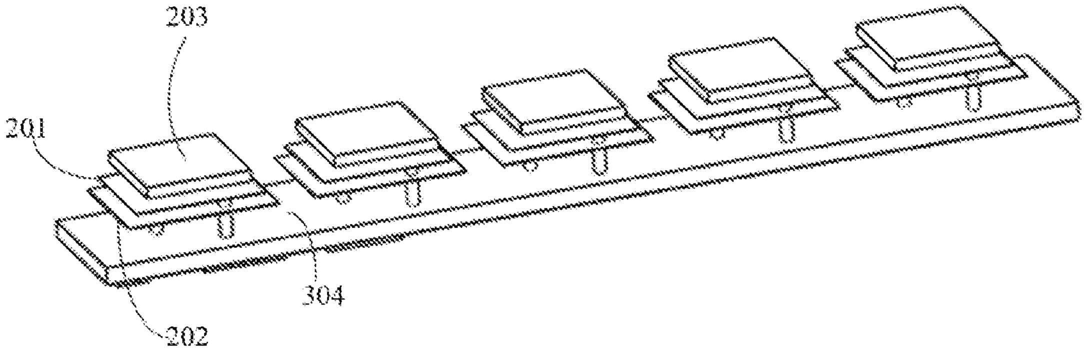
FIG. 11 is a second schematic diagram in which a feeding ejector pin is connected to a radiating patch according to an embodiment of the present disclosure.

As shown in FIG. 11, when the antenna unit of the present disclosure of the embodiments includes two coupling pieces and one radiating patch 201, a feeding hole also needs to be opened in the coupling piece between the radiating patch 201 and the radio frequency module, so that the feeding ejector pin 307 can pass through the feeding hole and is electrically connected to the radiating patch 201, and the feeding ejector pin 307 and the coupling piece are not connected to the ground. It should be noted that to illustrate the manner of connection between the feeding ejector pin 307 and the radiating patch 201 more clearly, the insulating dielectric layer used to fix the radiating patch 201 and the first coupling piece 202 is not shown in FIG. 11.

Figure 13:
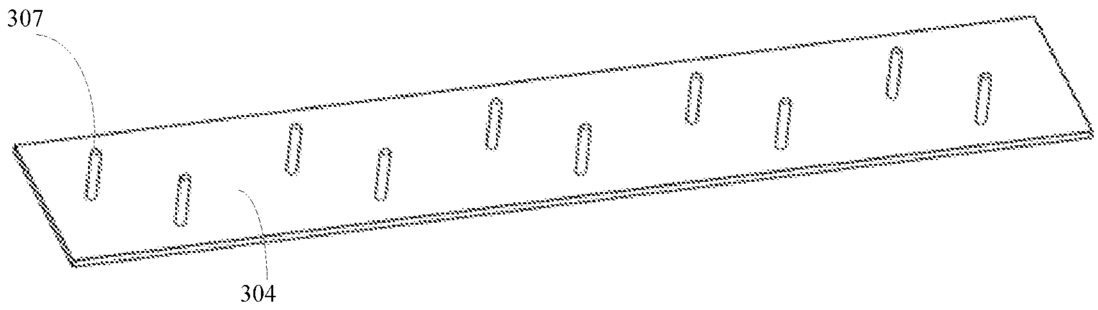
FIG. 13 is a schematic diagram in which a feeding ejector pin is disposed on a radio frequency module according to an embodiment of the present disclosure.

In addition, for a specific manner of disposing the feeding ejector pin 307 on the radio frequency module, as shown in FIG. 13, the feeding ejector pin 307 is disposed on the first ground layer 304. Specifically, the feeding ejector pin 307 is located on the third insulating dielectric layer 306, and is electrically connected to the radio frequency integrated circuit 309 on the second ground layer 305 through a wire in the third insulating dielectric layer 306. A first via is disposed in the first ground layer 304. The diameter of the first hole is greater than the diameter of the feeding ejector pin 307, that is, the feeding ejector pin 307 is located in the first via hole, but the feeding ejector pin 307 and the first ground layer 304 are not connected to the ground.

Optionally, the radiating patch 201 and the first coupling piece 202 are square, and the first accommodation groove 101 fits the radiating patch 201 and the first coupling piece 202. This can help mount the radiating patch 201 and the first coupling piece 202 in the first accommodation groove 101. It can be understood that the radiating patch 201 and the coupling piece are not limited to squares, and can also be disposed as other shapes, such as circles, regular triangles, regular pentagons, and regular hexagons.

Optionally, the radiating patch 201 and the first coupling piece 202 are disposed in parallel, and a straight line between the center of symmetry of the radiating patch 201 and the center of symmetry of the coupling piece is perpendicular to the radiating patch 201, so that the antenna unit formed by the radiating patch 201 and the first coupling piece 202 is a symmetrical structure. Therefore, an antenna array formed by the antenna unit can work in multiple bands, to have better roaming capabilities in a global millimeter-wave band. In addition, performance of space symmetry or a mapping direction can remain the same or similar during beam scanning.

Figure 17:
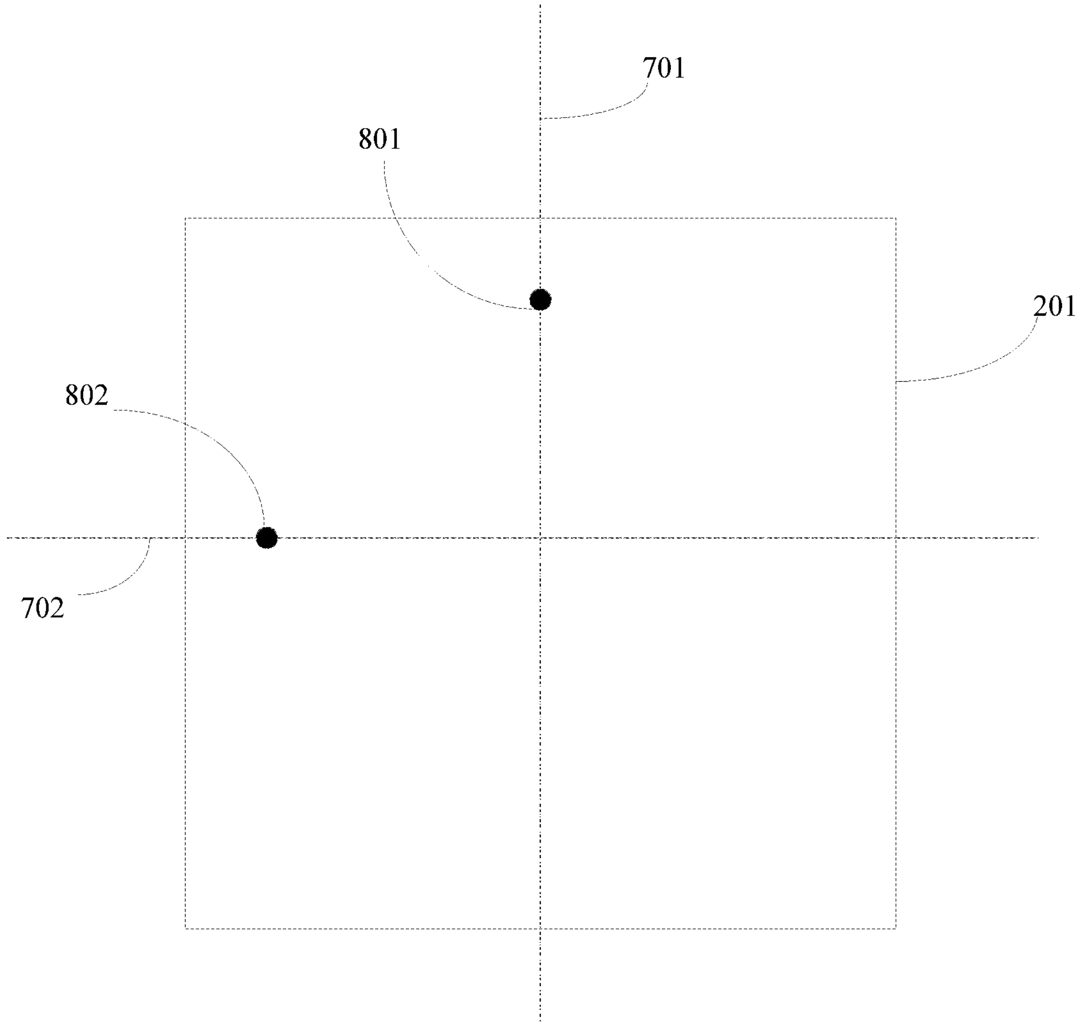
FIG. 17 is a schematic diagram of distribution locations of a first location and a second location on a radiating patch according to an embodiment of the present disclosure.

Furthermore, as shown in FIG. 17, electrical connection locations of the radiating patch 201 and the radio frequency module include a first location 801 and a second location 802. The first location 801 is located on a first symmetry axis 701 of the square and is adjacent to an edge of the square (that is, a shortest distance from the first location to four sides of the square is less than a preset value). The second location 802 is located on a second symmetry axis 702 of the square and is adjacent to an edge of the square (that is, a shortest distance from the second location to four sides of the square is less than a preset value). The first symmetry axis of 701 and the second symmetry axis 702 are symmetry axes formed by folding opposite sides of the square. That is, in the antenna unit in the embodiments of the present disclosure, orthogonal feeding is used. On the one hand, this can increase a wireless diversity connection capability of the antenna, reduce the probability of communication disconnection, and improve communication effects and user experience. On the other hand, this can help multiple input multiple output (MIMO) function to increase data transmission rates.

Optionally, the radio frequency module is a millimeter-wave radio frequency module.

In addition, the metal plate 1 in the embodiments of the present disclosure may be a part of the metal shell of the terminal, or a part of the radiator of the antenna on the terminal in the related technology, for example, a part of a radiator of a 2G/3G/4G/sub 6G communication antenna in the related technology. The antenna structure in the embodiments of the present disclosure can integrate a millimeter-wave antenna with a 2G/3G/4G/sub 6G communication antenna in the related technology, that is, make the millimeter-wave antenna compatible with a non-millimeter-wave antenna used as an antenna in the metal frame or metal shell, without affecting communication quality of the 2G/3G/4G/sub 6G communication antenna.

An embodiment of the present disclosure further provides a high-frequency multi-band wireless communication terminal, including the foregoing antenna structure.

Optionally, the high-frequency multi-band wireless communication terminal includes a shell, where at least a part of the shell is a metal back cover, and the metal plate 1 is a part of the metal back cover or the metal frame. That is, the metal plate 1 can be a part of the metal shell of the terminal, so that disposing of the antenna unit does not affect the metal texture of the terminal, that is, it is better compatible with products with a high metal coverage proportion.

Figure 15:
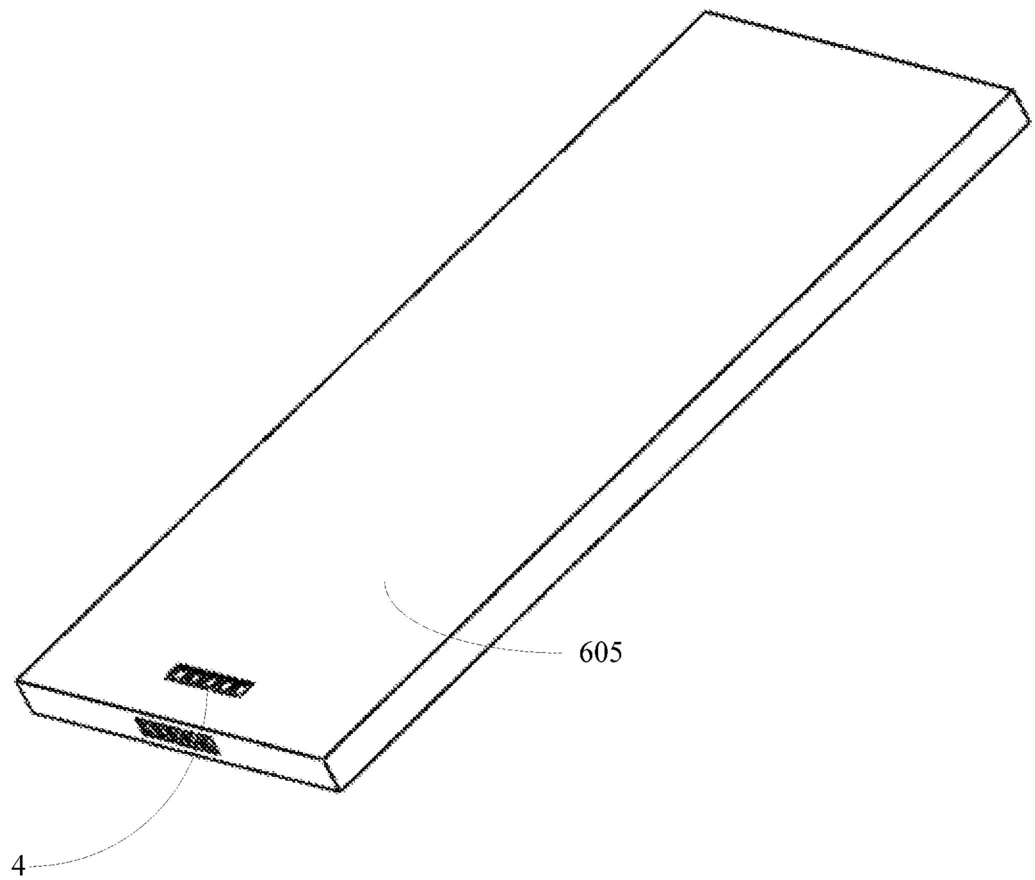
FIG. 15 is a first schematic diagram of a location of disposing an antenna structure on a shell of a terminal according to an embodiment of the present disclosure.
Figure 16:
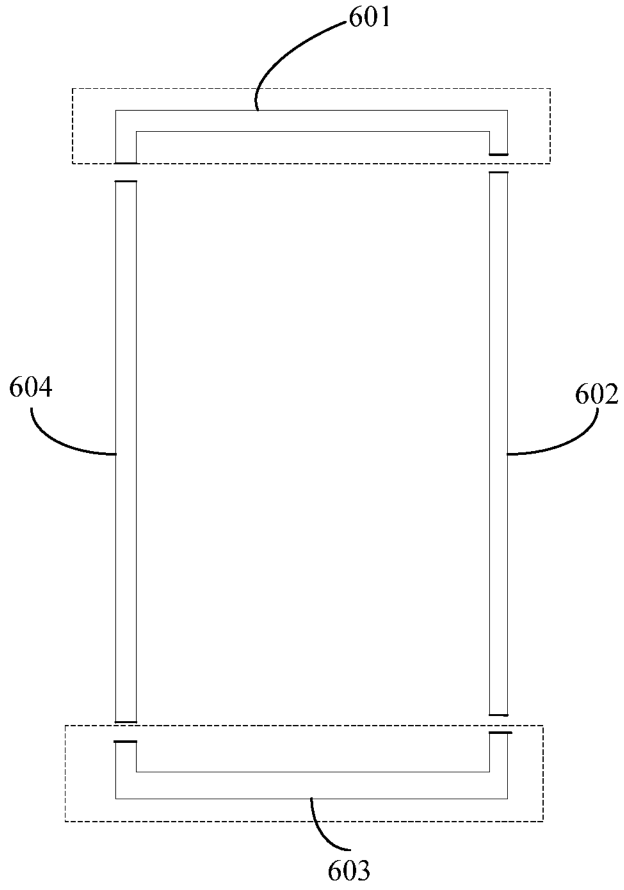
FIG. 16 is a second schematic diagram of a location of disposing an antenna structure on a shell of a terminal according to an embodiment of the present disclosure.

For example, as shown in FIG. 16, the housing of the high-frequency multi-band wireless communication terminal includes a first frame 601, a second frame 602, a third frame 603, a fourth frame 604, and the metal back cover 605. The first to the fourth frames surround a system ground 9, and the system ground 9 may include a printed circuit board (PCB), and/or the metal back cover, and/or an iron frame on the screen, or the like. The antenna structure 4 can be integrated on a metal frame circled by a dashed line in FIG. 16; or as shown in FIG. 15, the antenna structure 4 can be disposed on the metal back cover 605 of the terminal, to increase space coverage of an antenna signal and reduce the risk of performance degradation caused by antenna blockage, to enhance the communication effect.

The foregoing descriptions are merely the optional implementations of the present disclosure. It should be noted that those of ordinary skill in the art may further make several improvements and refinements without departing from the principles described in the present disclosure, and these improvements and refinements also fall within the protection scope of the present disclosure.

What is claimed is:

1. An antenna structure, comprising:

a metal plate, wherein the metal plate is provided with a first accommodation groove;

an antenna unit, wherein the antenna unit comprises a radiating patch and a first coupling piece; and a radio frequency module, wherein the radio frequency module is disposed on a first side of the metal plate, and the radio frequency module is electrically connected to the radiating patch;

wherein at least one of the radiating patch and the first coupling piece is disposed inside the first accommodation groove, the radiating patch is insulated from the metal plate, the first coupling piece is insulated from the metal plate, the radiating patch and the first coupling piece are disposed opposite to each other, the radiating patch is insulated from the first coupling piece, the first coupling piece is located between the radiating patch and the radio frequency module, the radiating patch is configured to generate resonance in a first preset band, and the first coupling piece is configured to generate resonance in a second preset band;

wherein the radio frequency module comprises a radio frequency integrated circuit and a power management integrated circuit, and the radio frequency integrated circuit is electrically connected to the radiating patch and the power management integrated circuit;

the radio frequency module further comprises a first ground layer, a second ground layer, and a third insulating dielectric layer, and the third insulating dielectric layer is located between the first ground layer and the second ground layer;

the radio frequency integrated circuit and the power management integrated circuit are located on the second ground layer, and the radio frequency integrated circuit is electrically connected to the power management integrated circuit through a first wire, the radio frequency integrated circuit is electrically connected to the radiating patch through a second wire, and the first wire and the second wire are located inside the third insulating dielectric layer.

2. The antenna structure according to claim 1, comprising a first plurality of accommodation grooves, each of the plurality of accommodation grooves being the first accommodation grooves, the first plurality of accommodation grooves are disposed at intervals, the antenna structure further comprises a plurality of antenna units corresponding to the first plurality of accommodation grooves, each of the plurality of antenna units is the antenna unit, and at least one of the radiating patch and the first coupling piece in one of the plurality of antenna units is disposed inside an accommodation groove of the first plurality of accommodation grooves corresponding to the one of the plurality of antenna units.

3. The antenna structure according to claim 2, wherein the first accommodation groove is provided with a first insulating dielectric layer, and the radiating patch is disposed inside the first insulating dielectric layer.

4. The antenna structure according to claim 3, wherein a second insulating dielectric layer covers a surface of the first ground layer, a first plurality of coupling pieces are disposed on the second insulating dielectric layer, each of the first plurality of coupling pieces is the first coupling piece, and the first plurality of coupling pieces are disposed at intervals.

5. The antenna structure according to claim 3, wherein one of the first plurality of coupling pieces is disposed in the first insulating dielectric layer in the first accommodation groove, and the first coupling piece and the radiating patch that belong to the same one of the plurality of antenna units are located in the same one of the first plurality of accommodation grooves.

6. The antenna structure according to claim 5, wherein a second insulating dielectric layer covers a surface of the first ground layer, the second insulating dielectric layer is provided with a third accommodation groove, the third accommodation groove has a depth equal to a thickness of the second insulating dielectric layer, the metal plate between two of the first plurality of accommodation grooves extends into the third accommodation groove, and the metal plate between the two of the first plurality of accommodation grooves and the first ground layer are connected to the ground.

7. The antenna structure according to claim 3, wherein the radio frequency module is provided with a feeding ejector pin, and the feeding ejector pin is electrically connected to the radiating patch.

8. The antenna structure according to claim 2, wherein the first accommodation groove is provided with a first insulating dielectric layer, the radiating patch is disposed on the first insulating dielectric layer, and the radiating patch extends by a first preset height from a surface of the first insulating dielectric layer; and a second insulating dielectric layer covers a surface of the first ground layer, a second plurality of accommodation grooves corresponding to the plurality of antenna units are disposed on the second insulating dielectric layer at intervals, each of the first plurality of coupling pieces is disposed inside a corresponding one of the second plurality of accommodation grooves, and a difference between a depth of one of the second plurality of accommodation grooves and a thickness of the first coupling piece is greater than or equal to the first preset height;

wherein the radiating patch is located inside one of the second plurality of accommodation groove.

9. The antenna structure according to claim 2, wherein the metal plate is provided with a positioning groove, the first plurality of accommodation grooves are connected to the positioning groove, and the radio frequency module is mounted in the positioning groove.

10. The antenna structure according to claim 1, comprising a plurality of antenna units, each of the plurality of antenna units being the antenna unit, wherein a second insulating dielectric layer is disposed on the radio frequency module, a first plurality of coupling pieces are disposed in the second insulating dielectric layer, the first plurality of coupling pieces are disposed at intervals, each of the first plurality of coupling pieces is the first coupling piece, a plurality of radiating patches are disposed in the second insulating dielectric layer and are disposed at intervals, each of the plurality of radiating patches is the radiating patch, and the radio frequency module is mounted in the first accommodation groove.

11. The antenna structure according to claim 10, also comprising: a metal piece, wherein the metal piece is disposed on the second insulating dielectric layer, the metal piece is located between two adjacent of the first plurality of coupling pieces, the metal piece is grounded, and the metal piece and the metal plate are in contact with each other.

12. The antenna structure according to claim 10, wherein the second insulating dielectric layer covers the first ground layer, the second insulating dielectric layer is provided with a third accommodation groove, the third accommodation groove is located between two adjacent of the first plurality of coupling pieces, the third accommodation groove has a depth equal to a thickness of the second insulating dielectric layer, the metal plate between two of the first plurality of accommodation grooves extends into the third accommodation groove, and the metal plate between the two of the first plurality of accommodation grooves is electrically connected to the first ground layer.

13. The antenna structure according to claim 1, wherein the antenna unit further comprises a second coupling piece, the second coupling piece and the radiating patch are disposed opposite to each other, the second coupling piece is insulated from the radiating patch, the second coupling piece is insulated from the metal plate, the radiating patch is located between the second coupling piece and the first coupling piece, and the second coupling piece is configured to extend a bandwidth of the first preset band.

14. The antenna structure according to claim 1, wherein the radiating patch and the first coupling piece are square, and the first accommodation groove fits the radiating patch and the first coupling piece.

15. The antenna structure according to claim 14, wherein the radiating patch and the first coupling piece are disposed in parallel, and a straight line between the center of symmetry of the radiating patch and the center of symmetry of the first coupling piece is perpendicular to the radiating patch.

16. The antenna structure according to claim 14, wherein electrical connection locations of the radiating patch and the radio frequency module comprise a first location and a second location, the first location is located on a first symmetry axis of the square and is adjacent to an edge of the square, the second location is located on a second symmetry axis of the square and is adjacent to an edge of the square, and the first symmetry axis and the second symmetry axis are symmetry axes formed by folding opposite sides of the square.

17. A high-frequency multi-band wireless communication terminal, comprising the antenna structure according to claim 1.

18. The high-frequency multi-band wireless communication terminal according to claim 17, comprising a shell, wherein at least a part of the shell is a metal back cover or a metal frame, and the metal plate is a part of the metal back cover or the metal frame.

19. An antenna structure, comprising:

a metal plate, wherein the metal plate is provided with a first accommodation groove;

an antenna unit, wherein the antenna unit comprises a radiating patch and a first coupling piece; and a radio frequency module, wherein the radio frequency module is disposed on a first side of the metal plate, and the radio frequency module is electrically connected to the radiating patch;

wherein at least one of the radiating patch and the first coupling piece is disposed inside the first accommodation groove, the radiating patch is insulated from the metal plate, the first coupling piece is insulated from the metal plate, the radiating patch and the first coupling piece are disposed opposite to each other, the radiating patch is insulated from the first coupling piece, the first coupling piece is located between the radiating patch and the radio frequency module, the radiating patch is configured to generate resonance in a first preset band, and the first coupling piece is configured to generate resonance in a second preset band;

wherein the antenna unit further comprises a second coupling piece, the second coupling piece and the radiating patch are disposed opposite to each other, the second coupling piece is insulated from the radiating patch, the second coupling piece is insulated from the metal plate, the radiating patch is located between the second coupling piece and the first coupling piece, and the second coupling piece is configured to extend a bandwidth of the first preset band.

20. A high-frequency multi-band wireless communication terminal, comprising the antenna structure according to claim 19.

* * * * *